United States Patent
Ruf et al.

(10) Patent No.: US 8,571,584 B1
(45) Date of Patent: *Oct. 29, 2013

(54) DELIVERY OF VOICE DATA FROM MULTIMEDIA MESSAGING SERVICE MESSAGES

(75) Inventors: Michael P. Ruf, Parkland, FL (US); Konstantin Othmer, Mountain View, CA (US); Sani El-Fishawy, Woodside, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 1176 days.

This patent is subject to a terminal disclaimer.

(21) Appl. No.: 11/828,251

(22) Filed: Jul. 25, 2007

Related U.S. Application Data (63) Continuation-in-part of application No. 11/007,700, filed on Dec. 8, 2004, now Pat. No. 7,317,929, which is a continuation-in-part of application No. 10/661,033, filed on Sep. 12, 2003, now Pat. No. 7,133,687, which is a continuation-in-part of application No. 10/407,955, filed on Apr. 3, 2003, now Pat. No. 7,013,155.

(51) Int. Cl.
*H04W 4/00* (2009.01)

(52) U.S. Cl.
USPC ............... 455/466; 455/412.1; 455/412.2; 455/413; 455/414.1; 455/414.2; 455/414.3; 455/414.4

(58) Field of Classification Search
USPC ............ 455/412.1–412.2, 413, 414.1–414.4, 455/466
See application file for complete search history.

(56) References Cited

U.S. PATENT DOCUMENTS

| | | | |
|---|---|---|---|
| 4,856,066 | A | 8/1989 | Lemelson |
| 5,146,487 | A | 9/1992 | Bergsman et al. |
| 5,313,515 | A | 5/1994 | Allen et al. |
| 5,483,580 | A | 1/1996 | Brandman et al. |
| 5,646,982 | A | 7/1997 | Hogan et al. |

(Continued)

FOREIGN PATENT DOCUMENTS

| | | |
|---|---|---|
| EP | 1 113631 | 7/2001 |
| EP | 1113631 A2 * | 7/2001 |

OTHER PUBLICATIONS

U.S. Appl. No. 11/007,700, filed Dec. 8, 2004, El-Fishawy et al.
U.S. Appl. No. 11/769,608, filed Jun. 27, 2007, Othmer et al.

(Continued)

*Primary Examiner* — Patrick Edouard
*Assistant Examiner* — Matthew Genack
(74) *Attorney, Agent, or Firm* — Workman Nydegger (57) ABSTRACT

Delivering the content of an audio-only Multimedia Messaging Service (MMS) message to a recipient without requiring the recipient device to be MMS-enabled. A sender creates an MMS message, and sends it to the device of the intended recipient. If the recipient device is not MMS-enabled and the MMS message contains only audio content, the message is conveyed to a message server, where the audio content is transcoded and stored in an IVR system or other location accessible to the recipient. If the intended recipient device supports the SMS protocol, an SMS notification alerting the recipient to the arrival of a new message is transmitted. If the recipient device is neither MMS- nor SMS-enabled, the recipient can be alerted of the receipt of an MMS message by voicemail, email, instant message, page, or another medium able to effect delivery. The notification includes instructions for accessing the message from the IVR system.

29 Claims, 6 Drawing Sheets

(56) References Cited

U.S. PATENT DOCUMENTS

| | | | |
|---|---|---|---|
| 5,675,507 A | 10/1997 | Bobo, II | |
| 5,697,060 A | 12/1997 | Akahane | |
| 5,751,791 A | 5/1998 | Chen et al. | |
| 5,781,614 A | 7/1998 | Brunson | |
| 5,844,969 A * | 12/1998 | Goldman et al. | 379/93.24 |
| 5,855,003 A | 12/1998 | Ladden et al. | |
| 5,889,840 A | 3/1999 | Lang et al. | |
| 5,905,774 A | 5/1999 | Tatchell | |
| 5,951,638 A | 9/1999 | Hoss et al. | |
| 5,974,449 A | 10/1999 | Chang et al. | |
| 6,014,375 A | 1/2000 | Janky | |
| 6,014,568 A | 1/2000 | Alperovich et al. | |
| 6,038,296 A | 3/2000 | Brunson et al. | |
| 6,052,384 A | 4/2000 | Huang | |
| 6,052,440 A | 4/2000 | Yuhn | |
| 6,075,844 A | 6/2000 | Goldberg et al. | |
| 6,097,941 A | 8/2000 | Helferich | |
| 6,144,644 A | 11/2000 | Bajzath et al. | |
| 6,175,856 B1 | 1/2001 | Riddle | |
| 6,198,808 B1 | 3/2001 | Martin | |
| 6,233,318 B1 | 5/2001 | Picard et al. | |
| 6,282,270 B1 | 8/2001 | Porter | |
| 6,304,752 B1 | 10/2001 | Rignell | |
| 6,335,962 B1 | 1/2002 | Ali et al. | |
| 6,343,216 B1 | 1/2002 | Kim | |
| 6,396,908 B1 | 5/2002 | O'Donovan et al. | |
| 6,418,307 B1 | 7/2002 | Amin | |
| 6,438,217 B1 | 8/2002 | Huna | |
| 6,463,131 B1 | 10/2002 | French-St. George et al. | |
| 6,519,479 B1 | 2/2003 | Garudadri et al. | |
| 6,597,702 B1 | 7/2003 | Caugherty | |
| 6,630,883 B1 | 10/2003 | Amin et al. | |
| 6,636,733 B1 | 10/2003 | Helferich | |
| 6,654,448 B1 | 11/2003 | Agraharam et al. | |
| 6,654,786 B1 | 11/2003 | Fox et al. | |
| 6,731,734 B1 | 5/2004 | Shaffer et al. | |
| 6,731,926 B1 | 5/2004 | Link et al. | |
| 6,751,477 B1 | 6/2004 | Alperovich et al. | |
| 6,785,363 B2 | 8/2004 | Culliss | |
| 6,799,033 B2 | 9/2004 | Kanefsky | |
| 6,826,264 B2 | 11/2004 | Valco et al. | |
| 6,865,259 B1 | 3/2005 | Shaffer et al. | |
| 6,882,708 B1 | 4/2005 | Bedingfield et al. | |
| 6,934,552 B2 | 8/2005 | Holley et al. | |
| 6,954,136 B2 | 10/2005 | Sauer | |
| 7,002,992 B1 | 2/2006 | Shaffer et al. | |
| 7,013,155 B1 | 3/2006 | Ruf et al. | |
| 7,031,437 B1 | 4/2006 | Parsons et al. | |
| 7,042,990 B2 | 5/2006 | Marsot | |
| 7,076,245 B1 | 7/2006 | Satapathy | |
| 7,133,687 B1 * | 11/2006 | El-Fishawy et al. | 455/466 |
| 7,151,923 B2 | 12/2006 | Boland et al. | |
| 7,233,788 B2 | 6/2007 | Kedem | |
| 7,251,480 B1 | 7/2007 | Oh et al. | |
| 7,317,929 B1 * | 1/2008 | El-Fishawy et al. | 455/466 |
| 7,873,390 B2 | 1/2011 | Cohen et al. | |
| 2001/0008556 A1 | 7/2001 | Bauer et al. | |
| 2002/0006782 A1 | 1/2002 | Kim | |
| 2002/0046315 A1 | 4/2002 | Miller et al. | |
| 2002/0071396 A1 | 6/2002 | Lee et al. | |
| 2002/0103003 A1 | 8/2002 | Mauro | |
| 2002/0115429 A1 | 8/2002 | Deluca et al. | |
| 2002/0194388 A1 | 12/2002 | Boloker et al. | |
| 2003/0028604 A1 | 2/2003 | Aktas et al. | |
| 2003/0043782 A1 | 3/2003 | Laursen et al. | |
| 2003/0055655 A1 | 3/2003 | Suominen | |
| 2003/0087632 A1 | 5/2003 | Sagi et al. | |
| 2003/0134617 A1 | 7/2003 | Duerk et al. | |
| 2003/0195006 A1 | 10/2003 | Choong et al. | |
| 2004/0022237 A1 | 2/2004 | Elliott et al. | |
| 2004/0176139 A1 | 9/2004 | Wang | |
| 2004/0203780 A1 | 10/2004 | Julka et al. | |
| 2004/0224678 A1 | 11/2004 | Dahod et al. | |
| 2005/0083910 A1 | 4/2005 | Hallin et al. | |
| 2005/0143056 A1 | 6/2005 | Iyer et al. | |
| 2005/0266829 A1 | 12/2005 | Tran et al. | |
| 2006/0089131 A1 | 4/2006 | Huang | |
| 2006/0094472 A1 | 5/2006 | Othmer et al. | |
| 2006/0189333 A1 | 8/2006 | Othmer | |
| 2008/0101221 A1 | 5/2008 | Mallet | |
| 2008/0153526 A1 | 6/2008 | Othmer | |
| 2009/0203357 A1 | 8/2009 | Harris et al. | |
| 2009/0298529 A1 | 12/2009 | Mahajan | |

OTHER PUBLICATIONS

U.S. Appl. No. 12/435,766, filed May 5, 2009, Othmer.
U.S. Appl. No. 13/618,190, filed Sep. 14, 2012, Othmer et al.
International Telecommunication Union, Series V: Data Communication Over the Telephone Network; Procedures for the simultaneous transmission of data and digitally encoded voice signals over the GTSN, or over 2-wire leased point-to-point telephone type circuits; ITU-T Recommendation V.70; Aug. 1996.
El-Fishawy et al. "Delivery of Voice Data from Multimedia Messaging Service Messages" U.S. Appl. No. 11/007,700, filed Dec. 8, 2004. See Office Actions mailed Jun. 15, 2006 and May 2, 2007.
U.S. Appl. No. 10/407,955, mailed Jun. 15, 2005, Office Action.
U.S. Appl. No. 10/407,955, mailed Dec. 8, 2005, Notice of Allowance.
U.S. Appl. No. 10/661,033, mailed Jul. 28, 2005, Office Action.
U.S. Appl. No. 10/661,033, mailed Jan. 12, 2006, Final Office Action.
U.S. Appl. No. 10/661,033, mailed Sep. 14, 2006, Notice of Allowance.
U.S. Appl. No. 11/007,700, mailed Jun. 15, 2006, Office Action.
U.S. Appl. No. 11/007,700, mailed Oct. 6, 2006, Office Action.
U.S. Appl. No. 11/007,700, mailed May 2, 2007, Office Action.
U.S. Appl. No. 11/007,700, mailed Jun. 21, 2007, Notice of Allowance.
U.S. Appl. No. 11/007,700, mailed Sep. 14, 2007, Notice of Allowance.
U.S. Appl. No. 11/129,126, mailed Oct. 1, 2007, Notice of Allowance.
U.S. Appl. No. 12/046,285, mailed Aug. 6, 2008 Office Action.
U.S. Appl. No. 12/046,285, mailed Feb. 9, 2009, Notice of Allowance.
U.S. Appl. No. 12/435,766, mailed Jun. 14, 2012, Restriction Requirement.
U.S. Appl. No. 12/435,766, mailed Sep. 5, 2012, Office Action.
U.S. Appl. No. 11/300,522, mailed Apr. 3, 2008, Office Action.
U.S. Appl. No. 11/300,522, mailed Dec. 30, 2008, Final Office Action.
U.S. Appl. No. 11/769,608, mailed Aug. 20, 2009, Office Action.
U.S. Appl. No. 11/769,608, mailed May 17, 2010, Final Office Action.
U.S. Appl. No. 11/769,608, mailed Dec. 28, 2010, Office Action.
U.S. Appl. No. 11/769,608, mailed May 25, 2011, Final Office Action.
U.S. Appl. No. 11/769,608, mailed Jun. 27, 2012, Notice of Allowance.
U.S. Appl. No. 12/435,766, mailed Mar. 22, 2013, Final Office Action.
U.S. Appl. No. 11/769,608, mailed May 24, 2013, Notice of Allowance.

* cited by examiner

DELIVERY OF VOICE DATA FROM MULTIMEDIA MESSAGING SERVICE MESSAGES

CROSS-REFERENCE TO RELATED APPLICATION

This application is a continuation-in-part of U.S. patent application Ser. No. 11/007,700, filed Dec. 8, 2004 (U.S. Pat. No. 7,317,929 issued Jan. 8, 2008), which is a continuation-in-part of U.S. patent application Ser. No. 10/661,033, filed Sep. 12, 2003 (U.S. Pat. No. 7,133,687 issued Nov. 7, 2006), which is a continuation-in-part of U.S. patent application Ser. No. 10/407,955, filed Apr. 3, 2003, (U.S. Pat. No. 7,013,155 issued Mar. 14, 2006). The foregoing patent applications are incorporated herein by reference.

BACKGROUND OF THE INVENTION

1. The Field of the Invention

The present invention relates to the delivery of messages in communication networks. More specifically, the present invention is directed to systems and methods that permit the delivery of audio-only Multimedia Messaging Service (MMS) messages to intended recipients via an alternate mechanism when a recipient device does not have the capability of directly processing MMS messages.

2. The Relevant Technology

The popularity of all types of devices, such as mobile telephones and hybrid devices such as "smart phones" that combine the functionality of mobile telephones with that of personal digital assistants (hereinafter referred to generally as devices) is undeniable. People want or need to communicate using voice while they are mobile. At the same time, the use of text messaging is also rising such that virtually any device on a 2G or 3G network can receive a Short Message Service (SMS) message. While text messaging using protocols such as SMS is somewhat popular, voice is still the preferred way to communicate when using a device, since using the keypad of such devices to input and send text messages can be cumbersome and time consuming. Voice messages are more convenient because they can be easily created and they take advantage of the native ability of devices to receive and output audio data.

Conventional voicemail systems provide the capability for anyone to leave a voicemail message after a telephone call has failed to reach the intended recipient. Using a conventional voicemail system to deliver a voice message to the recipient, a sender typically first must dial the recipient's telephone number in an attempt to reach the recipient "live" and then fail to do so, whereupon the voicemail system intercedes to allow a voice message to be recorded. In many cases, callers hoping to be able to leave a non-intrusive voice message instead interrupt the intended recipient. While conventional voicemail systems represent a convenient adjunct to direct telephone communication between a caller and a recipient, they often do not allow voice messages to be created and sent by senders without first making an attempt to establish a live telephone conversation with the recipient.

Another technology, Multimedia Messaging Service (MMS), allows senders with MMS-enabled devices to send multi-media messages, including voice messages, to other MMS-enabled devices. A user of an MMS-enabled device may alternatively send MMS-based voice messages to a web-site where they can be retrieved by the recipients. While this alternative may be occasionally acceptable, the use of a web browser to retrieve a voice message is inconvenient for the recipient when he does not have access to a web browser, and is cumbersome compared to the use of telephones to access voice messages. The proliferation of MMS-compatible devices has been and continues to be very slow, and it is likely that MMS-compatible devices will not be widely accepted by consumers until MMS users can reliably send MMS messages to a large number of recipients. The problem, of course, is that the large number of potential MMS recipients will not exist until MMS-compatible devices have already been widely accepted by consumers.

The foregoing technologies have introduced the convenience of voice messaging to large numbers of users. However, the foregoing techniques do not allow the sender to send an audio portion of an MMS-based message to a recipient regardless of the communication capabilities of the receiving device.

SUMMARY OF THE INVENTION

Embodiments of the present invention are directed to systems and methods for delivering the content of audio-only MMS messages to recipients regardless of the messaging capabilities of the receiving device. In particular, embodiments of the invention enable a sender to create an MMS message containing only audio content and deliver the message to a recipient whose device or land line telephone lacks the foregoing capabilities, without first calling the recipient. In this manner, a sender may conveniently create a communication and deliver it to a recipient in a non-intrusive manner, even though the receiving device does not support the messaging protocol of the communication.

A sender creates an MMS message and designates a recipient without first attempting to call the recipient. The MMS message is received at a message center by a message server and the message server determines whether a recipient device is capable of processing it and whether the MMS message contains only audio content. If the recipient device is capable of processing the message, the message is transmitted to the recipient device as-is. If the recipient device is not capable of processing the message and the message contains only audio content, the message server forwards the MMS message to an interactive voice response (IVR) system, transcoding the audio content to a format such as .WAV, .WMA or .MP3.

The message server determines an alternate mechanism for delivering or apprising the recipient about the MMS message. A notification may be sent to the recipient apprising the recipient of how to retrieve the message. The notification may provide instructions, including a telephone number, on how to call the IVR system and request the message, or the message may be attached to the notification sent to the recipient, or a link pointing to a web page where the message may be accessed may be provided. The notification may be an SMS message, instant message, email message, or a page. Alternately, the IVR system may call the recipient device and play the message when the call is answered. Or, the IVR system may transmit the instant voice message to a voicemail server associated with the recipient and the voicemail server may transmit a message-waiting notification to the recipient device. The instant voice message is transmitted to the recipient when the recipient requests the message.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

The present invention is directed to systems and methods for delivering the audio content of an audio-only MMS message to an SMS-enabled recipient device regardless of the other communication capabilities of the recipient device. The audio-only MMS messages are made available according to the invention by storing the content of the audio-only MMS messages and using SMS or another conveyance to transmit notifications to the recipient devices with instructions for accessing the stored audio content. If the instant voice message is an MMS message containing both a voice portion and other media and the recipient device is not MMS-enabled, the MMS messages are made available by storing the MMS messages on a web server and using SMS or another conveyance to transmit notifications to the recipient devices with instructions for accessing the MMS messages stored on the web server. In this manner, audio-only MMS messages can be conveniently created and sent to recipients with new or legacy devices without requiring the device to support the MMS protocol.

Figure 1:
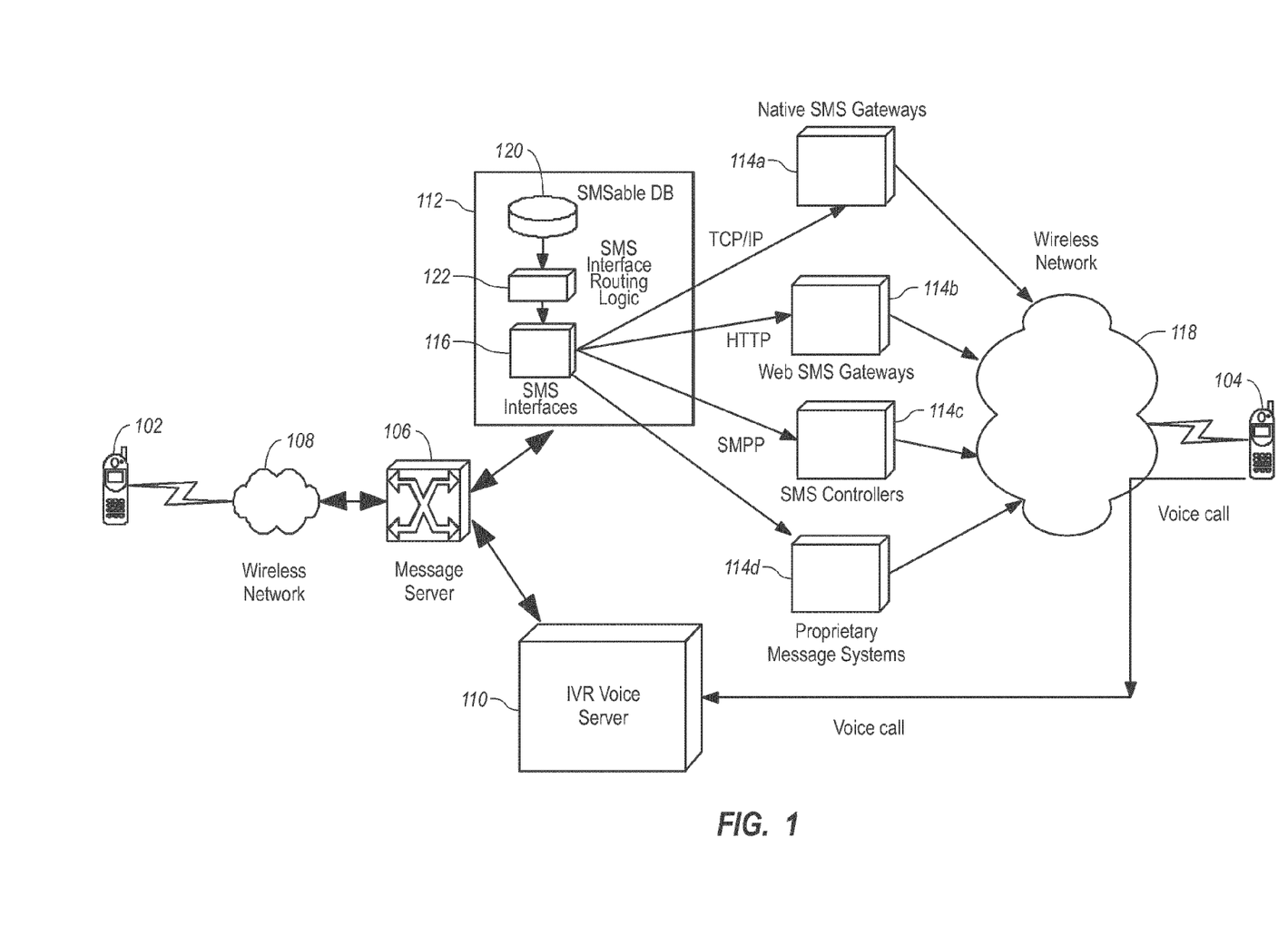
FIG. 1 is a block diagram illustrating a wireless network in which the voice messaging systems of the invention can be practiced.

FIG. 1 is a block diagram illustrating an example of a wireless communication system in which the invention can be practiced. The wireless communication system of FIG. 1 includes a sender device 102 that is used to create and transmit an instant voice message that is addressed to a recipient device 104. Sender device 102 and/or recipient device 104 can be a wireless or mobile telephone, a conventional wired/landline telephone, or any other telephony device. In general, sender device 102 can be any device that is capable of receiving and capturing audio data that forms the body of the instant voice message and addressing information that identifies the recipient or the recipient device 104 associated with the recipient. Instead of being a dedicated telephony device, sender device 102 can also be a personal computer, a personal digital assistant, or other computing devices having the foregoing capabilities.

In the embodiment of FIG. 1, sender device 102 communicates with a message server 106 using wireless data network 108. In general, however, sender device 102 can communicate with message server 106 using any suitable communication network or mechanism, another example of which is the Public Switched Telephone Network (PSTN). Message server 106 is a computer system that routes voice messages and performs the other operations described herein. It should be understood that the invention can be implemented in many types of network environments and various network architectures are applicable. In one embodiment, the message server 106 and the associated SMS blade 112 reside in a wireless operator's network infrastructure. In another embodiment, the message server 106 and the SMS blade 112 reside outside the domain of a wireless operator's infrastructure, and may be hosted, for example, by an independent hosting entity, such as an application service provider. Alternately, the message server 106 and the associated SMS blade 112 can reside behind a corporate firewall.

Figure 2:
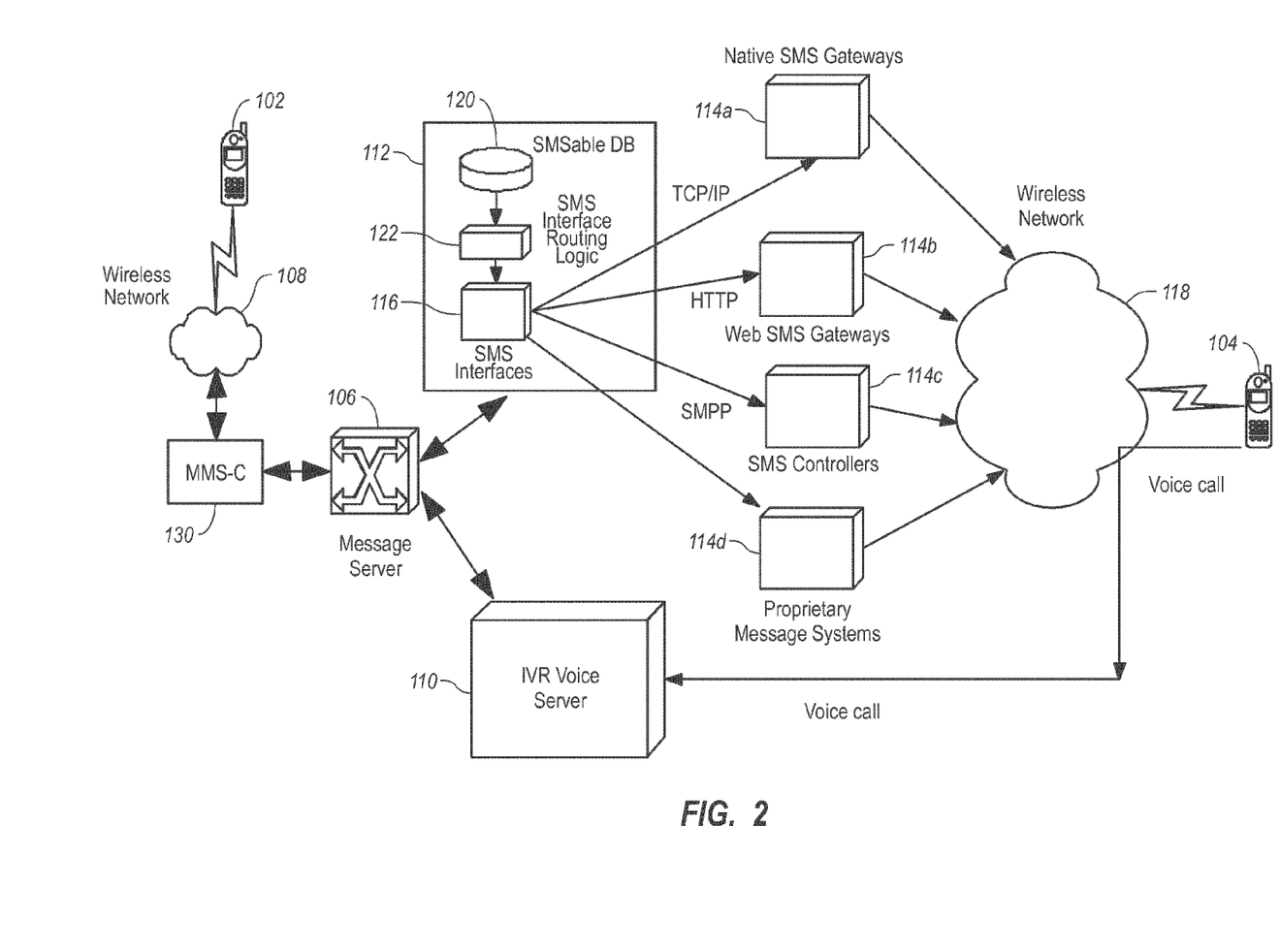
FIG. 2 is a block diagram illustrating another embodiment of a wireless network in which the voice messaging systems of the invention can be practiced.

In the embodiment of FIG. 2, sender device 102 communicates with an MMS-C 130 using wireless network 108. In general, however, sender device 102 can communicate with MMS-C 130 using any suitable communication network or mechanism, another example of which is the Public Switched Telephone Network (PSTN). MMS-C 130 is a computer system that receives and sends MMS messages by a process well known in the art. Message server 106 is a computer system that routes voice messages and performs the other operations described herein, including communicating with MMS-C 130 when necessary. In another embodiment all or part of the functionality of message server 106 and associated SMS blade 112 can be integrated with MMS-C 130.

In general, two types of instant voice messages are described herein. The first type includes instant voice messages that include only audio content and utilize a messaging protocol other than MMS. The second type includes MMS-based instant voice messages or messages having other formats that include audio content and may include other types of multimedia content. The instant voice messages of the invention are created using a dedicated voice messaging process that does not rely on first unsuccessfully attempting to establish a live telephone call with the intended recipient, as has been required in order to use conventional voice mail systems. As used herein, the terms "instant voice messaging" and "instant voice messages" refer to voice messaging that does not require the use of conventional voice mail systems in which the sender must first make an unsuccessful attempt to establish a live telephone call with the recipient. Instead, senders using an instant voice messaging system can cause an instant voice message to be created and sent to the recipient at a time of the sender's choosing. The invention is first described below in the context of messages that include only voice content and utilize a messaging protocol other than MMS. The manner in which this process is extended to delivering MMS-based instant voice messages will then be described.

Figure 4A:
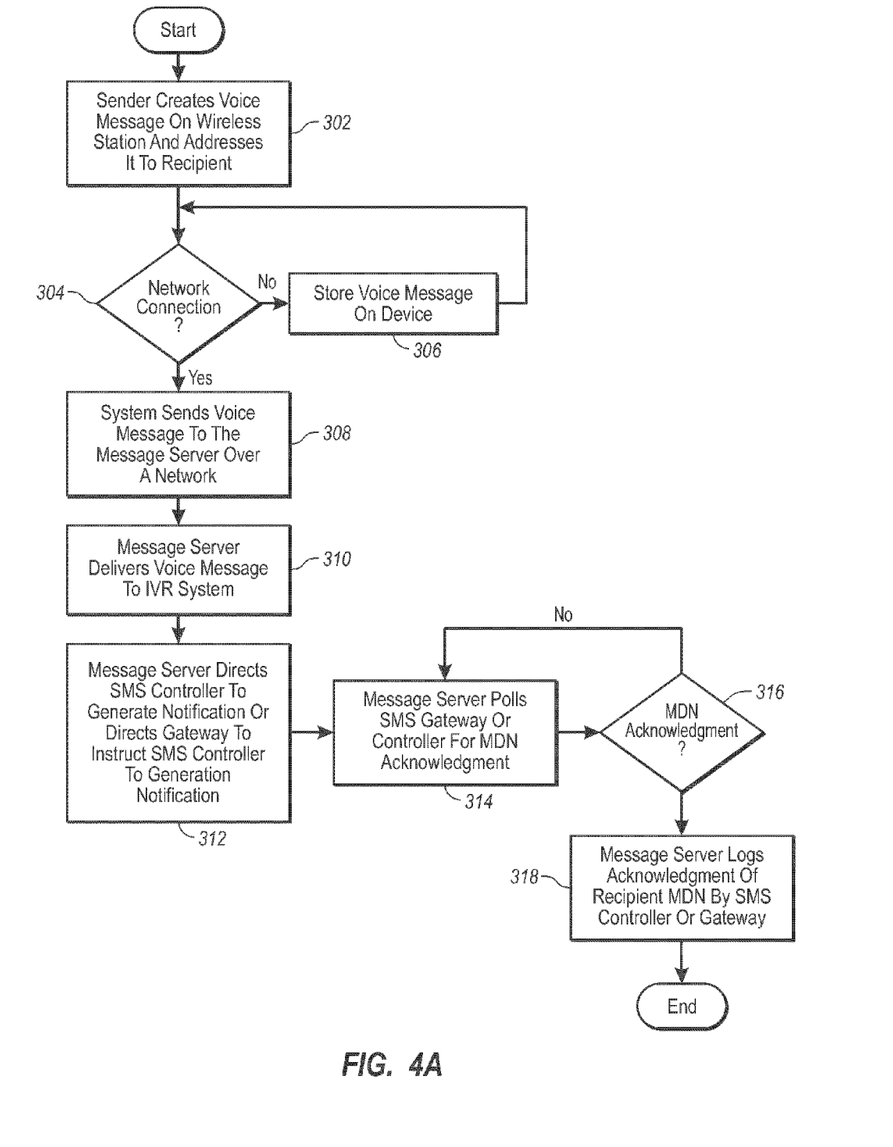
FIG. 4A is a flow diagram illustrating the method of initiating delivery of a voice message to a designated recipient.

An embodiment of the methods for creating and initiating transmission of an instant voice message is now described in reference to FIGS. 1 and 4a. In step 302 of FIG. 4a, a sender creates an instant voice message on the device 102 or other telephony device of the sender and addresses it to the recipient that uses recipient device 104.

Although the instant voice messages that are delivered according to the invention can be created at the sender device 102 using any of a variety of possible user interfaces and procedures, one embodiment of the invention employs a method whereby the sender is required to press a button on sender device 102 only once or twice. For instance, the process of composing and transmitting an instant voice message can begin by the sender pressing a designated button on the sender device 102. In response to the button input, the sender device transitions to a mode in which it assists the sender in the process of composing the instant voice message. The sender can also speak the name or phone number of the intended recipient in order to provide the address for the instant voice message.

As the sender device is activated and as the instant voice message is composed and sent, the sender device can output tones or verbal cues to guide the user through the process of creating and sending the instant voice message and to verify that the message is being composed and sent as intended. In order to transmit the instant voice message after it is created, the sender again presses a button on the sender device 102. In other embodiments, either or both of the user inputs associated with depressing a button on the sender device 102 can be replaced with verbal commands. In another embodiment the message can be automatically transmitted unless the sender specifically intervenes to stop transmission within a certain period of time after the message is created. This streamlined process of creating an instant voice message with minimal manipulation of the sender device is particularly useful in settings in which handling the sender device is difficult, such as when the sender is driving a car. Again, however, it is noted that the use of SMS or other delivery mechanisms to send notifications that indicate the delivery of instant voice messages to recipients can be practiced regardless of the procedure by which the sender uses the sender device to create the message.

The instant voice message is sent to the message server 106 after the instant voice message is created at the sender device 102. As shown in FIG. 4*a*, the sender device 102 determines in decision block 304 whether a network connection is currently present. For instance, the sender device 102 determines whether it is in range of a cellular base station. If the network connection is not present, the method advances to step 306, in which the instant voice message is stored locally on the sender device until such time that it is determined that a network connection is available.

When the network connection is available, the instant voice message is sent to the message server 106 in step 308. As noted above, the instant voice messages of the invention can be delivered to SMS-enabled recipient devices 104 regardless of the other communication capabilities of the recipient devices. The "other communication capabilities" that are referred to herein relate to the ability of the recipient devices to directly receive instant voice messages using specific protocols or using particular networks or network service providers. For instance, instant voice messages can be delivered to SMS-enabled recipient devices according to the invention without requiring the recipient devices to be compatible with dedicated protocols that can natively support direct voice messaging. In addition, the instant voice messages can be delivered to recipients who are not part of the same wireless or other communication network as that of the sender, who are not subscribers of the messaging services provided to the sender, and who do not have another affiliation with message server 106. In other words, the recipient can be essentially any recipient with an SMS-enabled recipient device and the ability to access an IVR system using a voice call as described herein.

Alternately or additionally, instant voice messages can be delivered to non-SMS-enabled recipient devices using one or more alternate delivery mechanisms, discussed in greater detail below. Alternately or additionally, recipient devices may be configured to process instant voice messages but are unable to process the current instant voice message due to constraints in the capabilities of the recipient device. For instance, a recipient device may be configured to process instant voice messages generally but is unable to process instant voice messages exceeding a particular size.

Returning to FIGS. 1 and 4A, although the SMS-enabled recipient devices 104 are not required to support dedicated messaging protocols, the methods of the invention can be adapted to take advantage of such messaging protocols if they are available. Otherwise, message server 106 of FIG. 1 delivers the instant voice message to an IVR voice server 110 of an IVR system in step 310 in preparation for instructing recipient device 104 to access the instant voice message from the IVR voice server. The message is stored in the IVR voice server 110 along with information identifying the recipient, including a Mobile Directory Number (MDN) associated with the device of the recipient. The IVR voice server 110 can use the MDN to authenticate the recipient when an attempt is made to retrieve the stored voice message as will be described in greater detail below. IVR voice server 110 and the associated IVR system can be adapted from conventional IVR voice servers and systems to perform the operations disclosed herein. Those of skill in the art, upon learning of the invention disclosed herein, will understand the necessary operational details of IVR voice server 110 and the associated IVR system.

In step 312 of FIG. 4*a* the message server 106 directs an SMS controller or gateway to generate and send an SMS message, or notification, regarding the fact that a voice message for the recipient device 104 has been stored in IVR voice server 110. In the embodiment of FIG. 1, the message server 106 uses an SMS blade 112 that interfaces with the appropriate SMS message generation mechanism 114*a-d*. The SMS blade 112 can be incorporated into message server 106 or can be implemented in a device that interfaces with the message server. The SMS blade 112 can use hardware, software, firmware, or a combination thereof to interface with the appropriate SMS generation mechanism 114*a-d* and to perform the other operations that are described in detail below in reference to FIG. 3.

In order to inform recipient device 104 of the stored voice message in IVR voice server 110, the appropriate SMS message generation mechanism 114*a-d* is used to create the notification for the recipient device. As shown in FIG. 1, the SMS message generation mechanisms include a native SMS gateway 114*a* that uses TCP/IP, a web SMS gateway 114*b* that uses HTTP, an SMS controller that uses the Short Message Peer to Peer Protocol 114*c* (SMPP), and proprietary message systems 114*d*. SMS blade 112 includes SMS interfaces 116 that communicate with the corresponding SMS message generation mechanisms 114*a-d* using the appropriate protocol. The appropriate SMS message generation mechanism 114 that is used to create and send the SMS message or notification to recipient device 104 is the SMS message generation mechanism that is capable of sending an SMS message to the recipient device. The message server directs the SMS controller or gateway to generate and send the SMS message by identifying the designated recipient using the MDN associated with the recipient.

If the message server 106 is not yet aware of which SMS message generation mechanism 114*a-d*, if any, is capable of sending SMS messages to the recipient, the message server, in step 314, polls the SMS controller or gateway for an MDN acknowledgment, which verifies that the particular SMS controller or gateway recognizes the recipient and can send the SMS message to the recipient device. If, according to decision block 316, the message server 106 receives the recipient MDN acknowledgment from a particular SMS controller or gateway, the message server logs this fact in database 120 in step 318 and can use this information to route future messages. More details regarding steps 314, 316 and 318 are described below in reference to FIG. 3.

The SMS message that is sent by the appropriate message generation mechanism 114 is transmitted by wireless network 118 to recipient device 104. Wireless network 118 is the wireless network in which recipient device 104 operates and can be the same as, or different from, wireless network 108 associated with the sender device. Indeed, one of the benefits of the invention is that voice messages can be delivered to recipient device 104 even if the recipient device operates in a different network or uses a different network service provider compared to those associated with sender device 102.

The SMS message notifies recipient device 104 that a voice message is stored in IVR voice server 110 and is waiting to be accessed and includes instructions for enabling the recipient device to access the voice message. The instructions can include the telephone number of the IVR voice server 110 and, optionally, an explanation of the way in which the voice message can be retrieved. The notification may also include information pertaining to the message such as a sender identifier, subject, time of creation, and location of sender. The notification is sent to the recipient and appears on the recipient's device along with an optional audio alert indicating arrival of the notification. The alert can be audible, visual, tactile, or any combination thereof.

Figure 5:
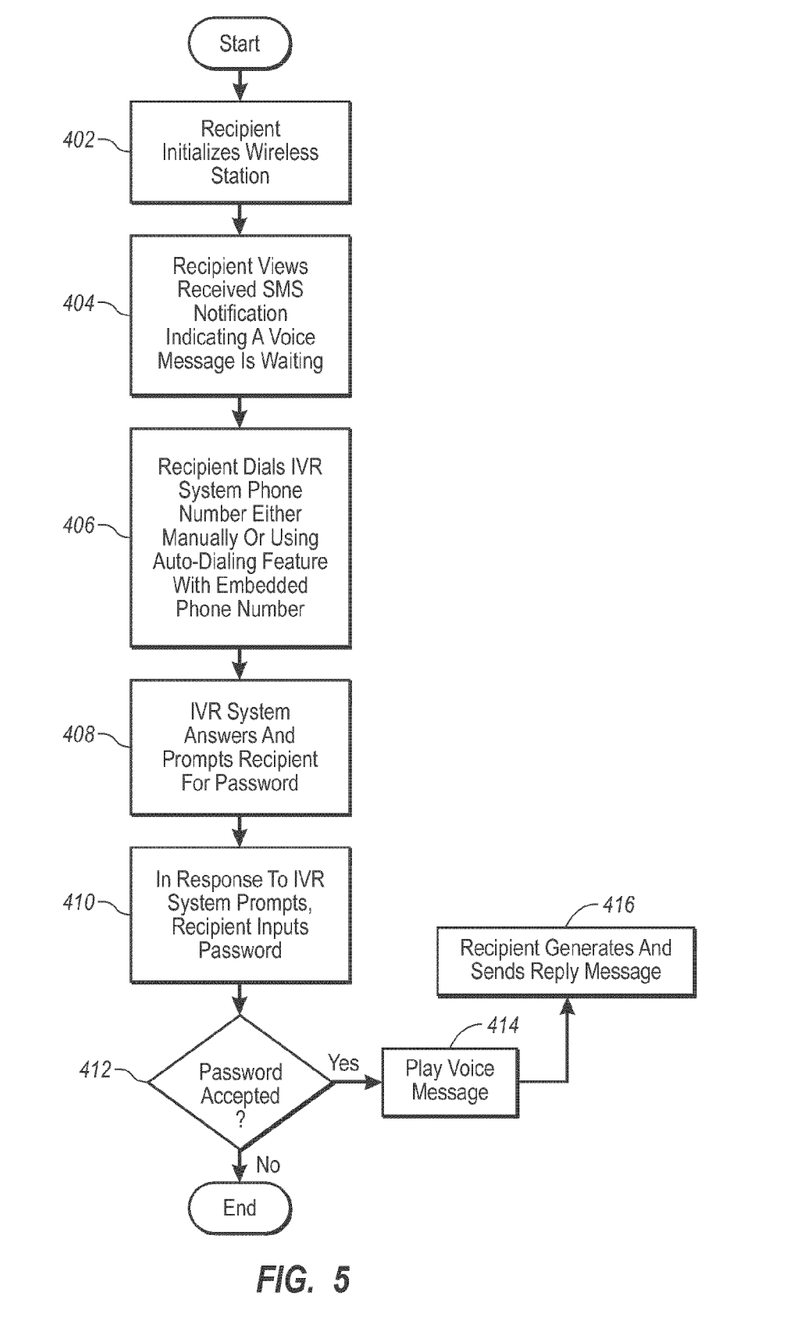
FIG. 5 is a flow diagram illustrating a method of the invention by which a recipient accesses a voice message in response to receiving an SMS notification.

An embodiment of the methods for accessing the stored instant voice message is now described in reference to FIGS. 1 and 5. In step 402, the recipient device is initialized by the recipient. The recipient then views the received notification, which in the embodiment is an SMS message, in step 404 and learns that an instant voice message is stored and is waiting to be accessed. In step 406, the recipient dials the IVR voice server 110 either manually or using an automatic dialing feature that executes the telephone number of the IVR voice server embedded in the SMS notification.

The IVR voice server 110 then answers the telephone call from the recipient in step 408 and prompts the recipient to enter a password that can authenticate the recipient. If the recipient has not previously accessed the IVR voice server 110 to retrieve instant voice messages, the recipient first creates a password that can be used to retrieve future messages. In the case of a first-time recipient, the IVR voice server generally requires a way to recognize or determine whether the party who claims to be the recipient is in fact the recipient designated by the sender. One technique for doing so requires the apparent recipient to place the first telephone call from the recipient's primary device 104 that has an MDN that matches the MDN corresponding to the recipient that the IVR voice server 110 has previously received and linked to the voice message. If the apparent recipient places a telephone call that has the matching MDN associated with the recipient device 104, the IVR voice server 110 concludes that the apparent recipient is the actual recipient. The recipient is then prompted to create a personal identification number or another password. This password is stored at the IVR voice server 110 and, when the recipient attempts to access future instant voice messages, the recipient can do so from any telephony device so long as the recipient can produce the correct password.

In response to the prompt of step 408, the recipient enters the password according to step 410. If, according to decision block 412, the password is accepted, the voice message is played by the IVR voice server 110 in step 414 and is thereby accessed by the recipient. The IVR voice server 110 can then also enable the recipient to manage the voice message in any of a variety of ways, including replaying the message, deleting the message, storing the message, forwarding the message to a second recipient, fast-forwarding through the message, fast-backwarding through the message, skipping over all or part of the message, etc.

The IVR voice server 110 can also permit the recipient to create and send 416 a reply instant voice message to the original sender. This process is initiated, for example, when the recipient responds to a voice prompt indicating that a reply instant voice message can be created. The recipient creates the reply instant voice message and indicates that it is to be sent to the original sender. At this point, the reply message is essentially another instant voice message that can be processed by message server 106 according to the methods described herein in reference to FIGS. 1-5. The reply message is stored in an IVR voice server and an SMS notification is sent to the original sender indicating that an instant voice message (i.e., the reply message) is accessible from the IVR voice server. The reply notification can be transmitted using SMS or another technology. The IVR voice server where the reply message is stored can be the same as or different from the IVR voice server 110 where the original voice message was stored.

In another embodiment of the invention in which the original sender creates instant voice messages using an audio messaging protocol other than MMS, the reply messages created using the IVR voice server 110 can be transcoded by message server 106 into an appropriate format, such as the adaptive multi-rate (AMR) format or another standard audio format utilized by the messaging protocol. In this case, the reply message can be sent to the original sender utilizing the audio messaging protocol. The foregoing process provides audio messaging protocol users with the ability to engage in two-way instant voice messaging communication with any SMS-enabled recipient device.

Various methods for optimizing bandwidth usage and enhancing the performance of the wireless communication system can be employed in combination with the instant voice messaging methods of the invention. For example, the instant voice messages described herein can be routed from the sender to the recipient at times selected to reduce peak usage of the network. In addition, the decision to transmit an instant voice message at or near the time at which it is generated or to delay transmission thereof can be made based on a priority assigned to the instant voice message. The priority can be assigned based on the subscription level of the sender or the recipient or based on preferences of the sender.

The priority value assigned to the instant voice message can be used to determine whether the delivery of the instant voice message can be time shifted in order to avoid excessive peak traffic in the wireless network. The time shifting can involve delaying the transmission of an instant voice message stored locally on the device of the sender or delaying the transmission of a notification to the recipient device. Details associated with the methods for routing network data, such as instant voice messages, based on the priority of the data are described in U.S. Provisional Patent Application Ser. No. 60/494,644, filed Aug. 11, 2003, entitled "Bandwidth Usage Optimization and Enhanced Performance for Wireless Networks," which is incorporated herein by reference.

As noted above, recipients can receive voice messages using an SMS-enabled device regardless of the other communication capabilities of the device. Likewise, the instant voice messages can be delivered to recipients who are not part of the same wireless network as that of the sender, who are not subscribers of the messaging services provided to the sender, and who do not have another affiliation with message server 106. In addition, any such recipient can then transmit a reply instant voice message to the original sender. Thus, any sender who subscribes to the messaging services that permit the sender to compose and initiate the instant voice messages described herein can engage in two-way instant voice messaging with substantially any SMS-enabled recipient device.

When a voice message is created and addressed to the recipient, the message server 106 and the associated SMS blade 112 operate to determine whether the designated recipient uses an SMS-enabled device and whether the instant voice message can be delivered to the recipient. An embodiment of this method is now described in reference to FIGS. 1 and 3, which expands on the information described above in reference to steps 314, 316 and 318 of FIG. 4a. According to the method of FIG. 3 the message server or the SMS blade attempts to determine if a telephone number associated with the designated recipient is able to receive an SMS message. At block 202, an MDN that identifies the recipient's device is obtained. The SMS blade 112 includes an SMSable database 120, which is a database that includes information specifying whether the designated recipient has an SMS-enabled device, whether the designated recipient does not have an SMS-enabled device or whether it is not yet determined whether the recipient has an SMS-enabled device. The database 120 can be linked to or can include a contact or address list maintained by the sender. In decision block 204, the database 120 is accessed to determine whether the database includes information relating to whether the recipient has an SMS-enabled wireless device.

Figure 3:
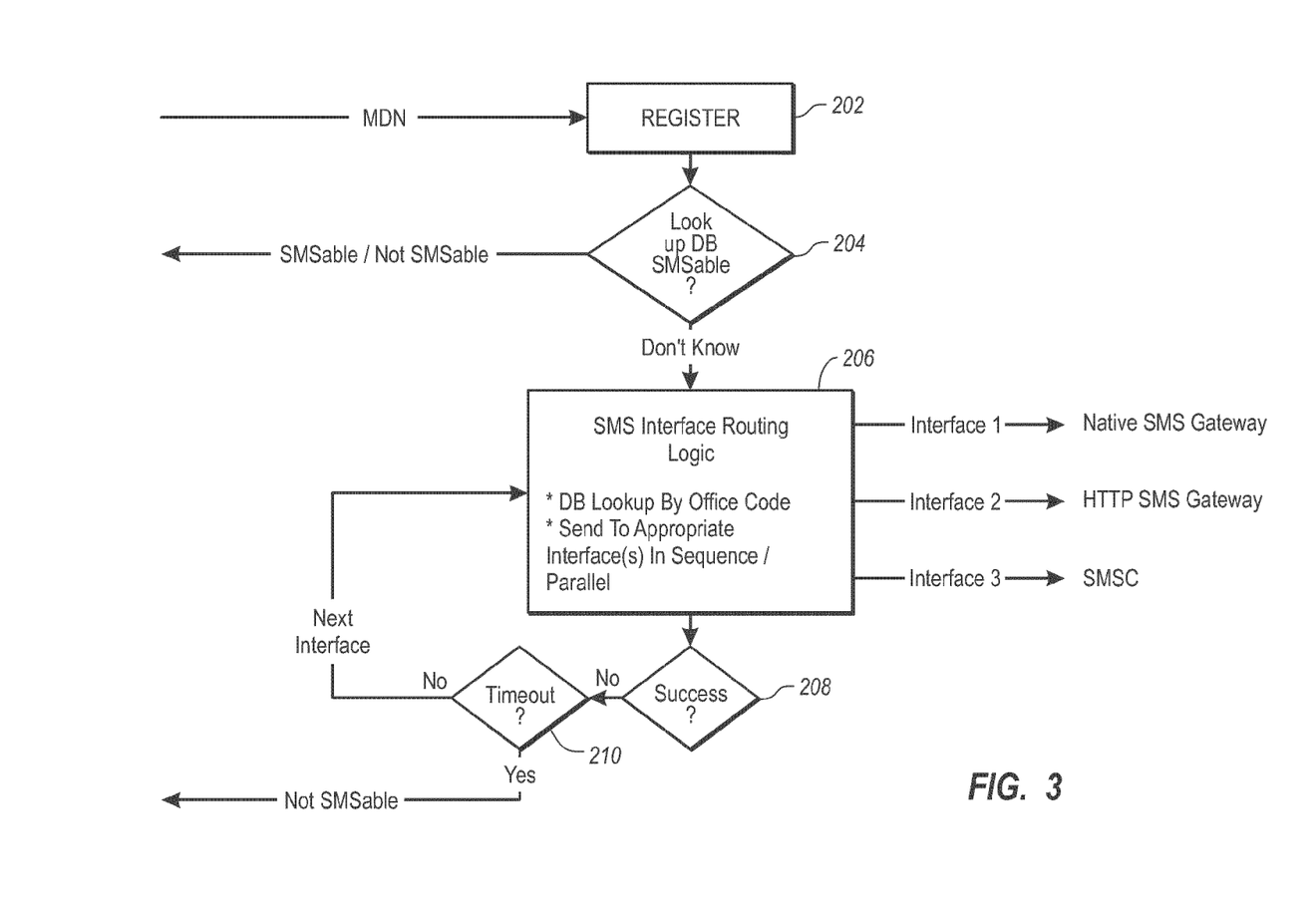
FIG. 3 is a flow diagram illustrating a method by which an SMS blade determines whether delivery of a voice message to a designated recipient is possible and, if so, initiates delivery of the voice message.

If, according to decision block 204, it is determined that the recipient wireless device is SMS-enabled, the appropriate SMS message generation mechanism 114a-d, as specified by database 120, is used to create and send the SMS notification. If the database 120 indicates that the designated recipient does not have an SMS-enabled device, the voice message is undeliverable using the SMS notification technique. However, the database can support other delivery mechanisms, such as email, pager, IM, or voicemail. If none of these mechanisms are available to the recipient device, the message is deemed undeliverable and an error message can be returned to the sender.

If, however, the database 120 does not specify whether the recipient has an SMS-enabled device, the method then advances to step 206, in which SMS interface routing logic 122 of FIG. 1 is used to initiate a trial and error routine in which attempts are made to send SMS notifications to the recipient.

As shown in FIG. 3, the attempts to send SMS notifications can be made by using the SMS interfaces 116 and the corresponding SMS mechanisms 114a-d in parallel or in sequence. In response to an attempt with each of the SMS mechanisms 114a-d, it is determined in decision block 208 whether the attempt to send an SMS notification has been successful. With each attempt, the message server 106 monitors the SMS controller or SMS gateway for an indication that the target recipient telephone number has been recognized and accepted. If so, the recipient device is determined to be SMS-enabled and the notification of the voice message stored in IVR voice server 110 can be delivered to the recipient device. In addition, if the attempt is successful, the database 120 is updated to indicate that the recipient device is SMS-enabled and to specify the appropriate SMS mechanism 114a-d to use in response to receiving future voice messages.

If the attempt is unsuccessful in decision block 208, the method proceeds to decision block 210 in which it is determined whether sufficient time has elapsed without a successful SMS notification delivery to conclude that the recipient does not have an SMS-enabled device. If this is the case, the database is updated to indicate the lack of an SMS-enabled device and an error message can be returned to the sender.

Checking the various interfaces for the ability to send an SMS message to a particular recipient can occur in response to a sender addressing and initiating delivery of a voice message to the recipient. This process can also take place in the background without being initiated by a particular voice message that is to be delivered to the recipient and without a subsequent action of sending an SMS message to the recipient. For example, the checking process can be performed in the background when the sender inputs a new phone number into the sender's contact list, even if the sender has not attempted to send any messages to that phone number. Further, other contact information, such as a pager number, e-mail address, etc. associated with a recipient in the sender's contact list may be obtained and stored in the database as an address to which notifications may be sent.

Figure 4B:
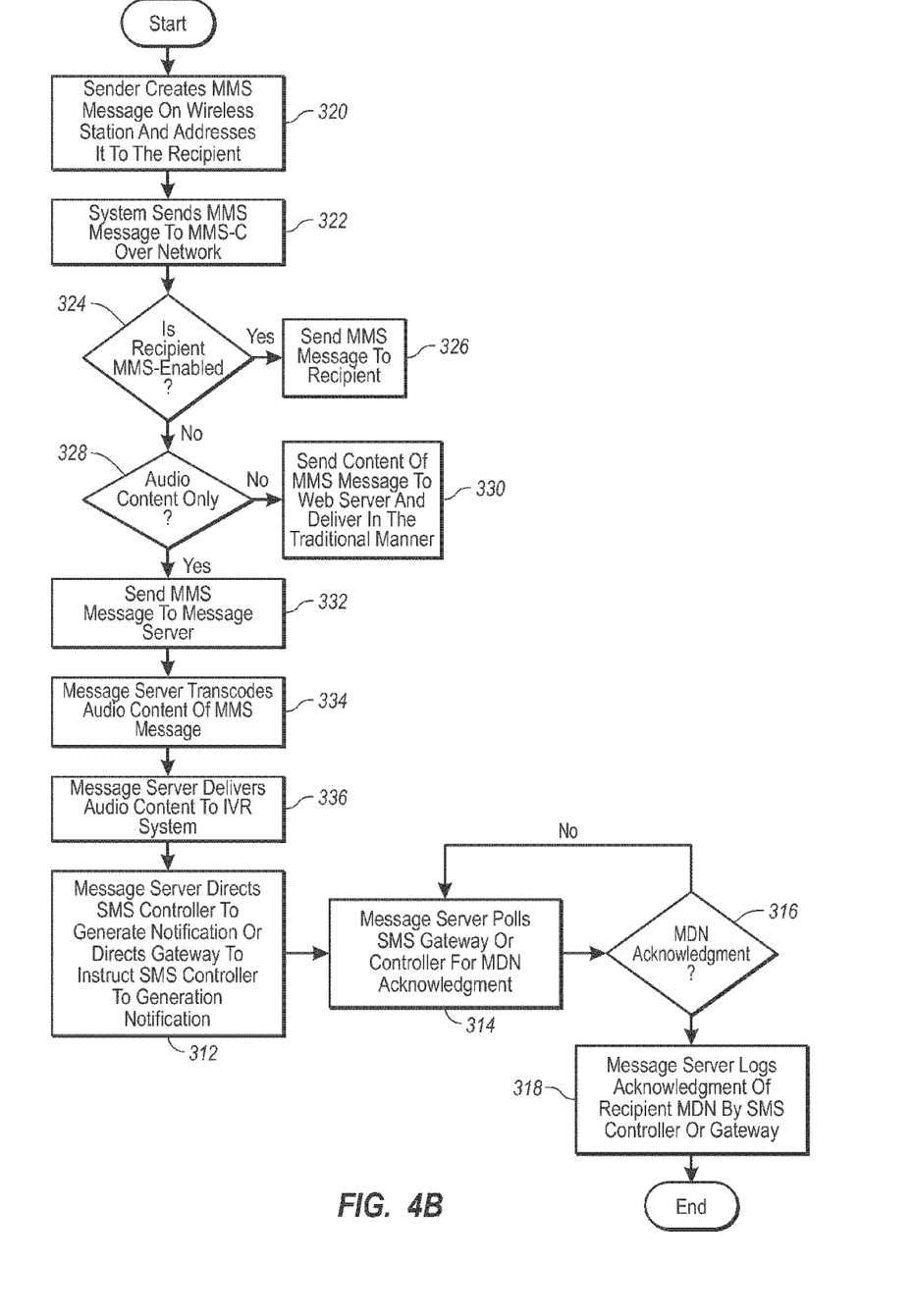
FIG. 4B is a flow diagram illustrating a method of initiating delivery of an MMS-based instant voice message to a designated recipient, including transcoding the audio content of the MMS message.

The invention has been described above in the context of the creation of an instant voice message with only voice content, using other than the MMS protocol, which is stored in an IVR voice server, with an SMS or other notification being sent to the recipient. These methods can also be adapted to enable users with MMS-enabled devices to cause the audio portion of audio-only MMS messages to be delivered to recipients with SMS-enabled devices, as shown in FIG. 4b. In this embodiment, the sender creates an MMS-based instant voice message in a conventional way in step 320, and the MMS message can include any type of content in addition to the audio content. At a time selected by the sender, the MMS message is sent in step 322 to the multimedia messaging service central (MMS-C) 130 of FIG. 2. This system can be optionally adapted to store the MMS-based instant voice message locally on the device prior to being sent to the MMS-C 130 if it is determined that no network connection is immediately available, as has been described herein in reference to steps 304 and 306 of FIG. 4a. When the MMS-based instant voice message has been sent to MMS-C 130, the MMS-C then determines if the intended recipient device is MMS-enabled as shown at decision block 324 of FIG. 4b.

If the recipient uses an MMS-enabled device, the full MMS message can be delivered to the recipient in the conventional manner for delivery of MMS messages as shown at step 326, which is well known in the art. Alternately or additionally, the recipient device may be MMS-enabled but with one or more constraints regarding the processing of MMS messages. For instance, the recipient device may be unable to process MMS messages exceeding a particular size, and/or may be unable to process particular content included in the MMS message. If an MMS-enabled recipient device is unable to process the MMS-based instant voice message due to one or more constraints on its MMS messaging capabilities, the method of FIG. 4B continues as if the recipient device is not MMS-enabled, as described below.

If it is determined that the recipient does not have an MMS-enabled device (or has an MMS-enabled device with limited capabilities), but does have an SMS-enabled device, the MMS-C next determines if the MMS message includes only audio content as shown at decision block 328. If the MMS message contains content in addition to or instead of audio content, the MMS message can be delivered to the recipient using a web server as shown at step 330. Traditionally, this may be accomplished by the MMS-C delivering the MMS message to the web server and the web server sending an SMS message to the recipient device instructing the recipient to go to a specific website on the Internet where the MMS message may be accessed.

If the MMS message contains only audio content, the MMS-C 130 passes the MMS message to message server 106 in step 332 using a standard interface such as the MM3 protocol. Message server 106 then transcodes the audio content to an audio format such as .WAV, .WMA, or MP3 in step 334. Message server 106 sends the audio content of the message to IVR voice server 110 as shown at step 336, or otherwise stores the audio content of the message in a location accessible to the recipient, such as in a voicemail server associated with the recipient. In effect, the audio content becomes an instant voice message including only voice or audio data, which is then processed in the manner described herein in reference to FIGS. 1-4*a* and 5. In particular, steps 312, 314, 316 and 318 are performed as previously described in reference to FIG. 4*a*. As part of this process, in one embodiment an SMS notification is sent to the recipient with an SMS-enabled device, which prompts the recipient to access the message from the IVR voice server 110.

This method can be further extended to permit the user of an MMS-enabled device to cause the content of audio-only MMS messages to be delivered to recipients with neither MMS- nor SMS-enabled devices. In this case, the system of the invention allows for the content of the audio-only MMS message to be conveyed to the recipient using an alternate delivery or apprising mechanism. A variety of mechanisms can be adopted to carry out this function, such as instant messaging, email, voicemail or page. For example, in one embodiment of the invention where the intended recipient of an MMS-message does not have an MMS- or SMS-enabled device, the system of the invention is able to deliver a notification in the form of an instant message or email message to the intended recipient via the recipient's computer. The notification can contain a link that points to a web page or instructions to call into the IVR system to retrieve the instant voice message. When the recipient clicks on the link, it opens a web page in a computer browser, where the recipient is able to access and play the content of the audio-only MMS message using the computer's audio software and hardware, or the recipient may call the IVR system and retrieve the instant voice message as has already been described. The instant voice message may also be transmitted to a recipient as an attachment to an email message.

In another aspect of the invention, a notification may be sent to a recipient's pager, the notification including a telephone number of the IVR system and a password to gain access to the IVR system. Alternately, the instant voice message may be transmitted to a voicemail server associated with the recipient device and the voicemail server may transmit a message-waiting notification to the recipient device apprising the recipient to dial voicemail to retrieve the message. Advantageously, this and other embodiments enable delivery of the audio content of an MMS message to a landline telephone and/or other telephony devices that are neither MMS- nor SMS-enabled In yet another aspect of the invention, rather than notify a recipient of the arrival of an MMS message, then have the recipient dial into the service using any telephony device to hear it, the system can place a phone call to the recipient device and play the message when the recipient answers. Alternate mechanisms can be used to deliver an MMS message in this method, including telephony networks such as VoIP and PSTN.

As described herein, recipients of instant voice messages can reply to the original senders using the IVR voice server 110. Returning to the embodiment of the invention in which the original senders have MMS-enabled devices, the reply messages created using the IVR voice server 110 can be transcoded by message server 106 into an MMS format, such as the adaptive multi-rate (AMR) format or another standard audio format utilized by MMS. In this case, the reply message can be sent to the original sender in the MMS format. The foregoing process provides MMS users with the ability to engage in two-way instant voice messaging communication with any SMS-enabled recipient device.

Advantageously, embodiments of the invention enable recipients of messages to have access to the IVR voice server even in instances where the recipients do not subscribe to a particular type of messaging or do not have various capabilities. For example, a sender can use the IVR to create and send audio-only MMS messages to other devices that are not capable of processing or of receiving audio-only MMS messages. At the same time, the recipient can still access the IVR and perform various messaging functions (listen, delete, reply, etc.). Further, the recipient also has the ability to respond via the IVR voice server using the same type of message. Alternatively, the recipient may be able to reply to the message using capabilities of their own device.

Another aspect of the invention is the ability for a user who wishes to send an instant voice message to initiate a voice call, using any kind of telephony device, to the IVR voice server without having been otherwise prompted, record a voice message and address it to the target recipient, and initiate delivery of the voice message. In this embodiment, a sender device 104 places a voice call to IVR voice server 110 and follows the system prompts for creating and addressing an instant voice message. The instant voice message is stored in IVR voice server 110, which then notifies message server 106 of the available instant voice message. In one scenario, message server 106 is aware of the capabilities of the recipient's device, and if it knows that the recipient device is SMS-enabled, it causes an SMS notification with instructions for accessing the instant voice message from the IVR voice server 110 to be sent to the recipient's device. Alternatively, if message server 106 is aware that the target recipient has an MMS-enabled device, message server 106 transcodes the instant voice message into an audio format that can be utilized by MMS, such as the AMR audio format, and delivers the voice message to MMS-C 130. MMS-C 130 then delivers the MMS instant voice message to the recipient's device in the conventional manner.

In the foregoing manner, messages can be created on a sender device, sent over a wireless and/or other communications network, and accessed by any new or legacy device, regardless of the type of network, subscriber or member status, or type of sending device or receiving wireless device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a communication system, a method of initiating delivery of an instant voice message to a recipient device, comprising:

receiving a multimedia messaging service (MMS) message for a recipient from a sender device at a message server without the sender device placing a call to the recipient, the sender device associated with a messaging service that includes the message server and an interactive voice response (IVR) system, the MMS message designating a recipient, wherein the sender device is associated with the message server and the recipient device is not associated with the message server;
determining the content of the MMS message;
if the MMS message includes audio content, storing the audio content in an interactive voice response (IVR) system;
initiating transmission of a Short Message Service (SMS) notification to the recipient device, the SMS notification including information permitting the recipient device to access the IVR system; and
transmitting the stored audio content from the IVR system to the recipient device.

2. The method of claim 1, wherein the recipient is associated with an operator different from the operator associated with the sender.

3. The method of claim 1, further comprising:
obtaining a reply message created by the recipient; and
delivering the reply message to the sender.

4. The method of claim 3, wherein obtaining a reply message comprises recording the reply message at the IVR system in which the audio content from the MMS message is stored.

5. The method of claim 3, wherein delivering the reply message to the sender comprises:
transcoding the audio content of the reply message to an audio format associated with MMS to create a reply MMS message; and
initiating transmission of the reply MMS message to the sender device.

6. The method of claim 3, wherein the recipient uses the IVR system to create the reply message.

7. The method of claim 3, wherein the reply message is created without the recipient device being compatible with any dedicated protocol that can natively support direct voice messaging.

8. The method of claim 1, wherein receiving the MMS message for the recipient from the sender device is performed upon the establishment of a network connection with the sender device, wherein the message has been previously created and stored at the sender device at a time when no network connection with the sender device exists.

9. The method of claim 1, wherein the recipient device does not have the capability of processing the MMS message.

10. The method of claim 1, further comprising transcoding the audio content prior to storing the audio content in the IVR system.

11. The method of claim 1, wherein the recipient device is configured to process MMS messages but is unable to process the MMS message received at the message server due to one or more constraints in the capability of the recipient device to process MMS messages.

12. The method of claim 11, wherein the one or more constraints in the capability of the recipient device to process MMS messages comprises a maximum message size, the maximum message size being exceeded by the MMS message received at the message server.

13. In a communication system, a method of enabling a recipient having a recipient device that is not Multimedia Messaging Service (MMS)-enabled to receive audio content from an MMS message and to respond thereto, comprising:
sending audio content of an MMS message to a recipient, including:
receiving the MMS message from a sender device without the sender device placing a call to the recipient, the message including only audio content, wherein the sender device is associated with a message server that forwards the MMS message and the recipient device is not associated with the message server;
storing the audio content in a first interactive voice response (IVR) system from which the recipient accesses the audio content; and
initiating transmission of a Short Message Service (SMS) notification to the recipient device, the SMS notification including information permitting the recipient device to access the voice content from the first IVR system; and
sending a reply from the recipient to the sender of the MMS message, including:
in the first IVR system, recording a reply message that is created by the recipient and is to be delivered to the sender;
transcoding the audio content of the reply message to an MMS format to create an MMS reply message; and
initiating transmission of the MMS reply message to the sender device.

14. The method of claim 13, wherein sending audio content of an MMS message to a recipient further includes transcoding the audio content to a non-MMS format.

15. The method of claim 14, wherein a non-MMS format comprises a format selected from the group of .WAV format, .WMA format or MP3 format.

16. The method of claim 13, wherein the recipient is associated with an operator different from the operator associated with the sender.

17. In a communication system, a method of initiating delivery of a Multimedia Messaging Service (MMS) message to a recipient, the method comprising:
receiving an MMS message designating a recipient device of a recipient at a message server from a sender device without the sender device placing a call to the recipient, wherein the sender device is associated with the message server and the recipient device is not associated with the message server, wherein the recipient device does not have the capability of directly processing the MMS message, the MMS message including only audio content;
storing the audio content of the MMS message;
determining an alternate mechanism for apprising the recipient about the audio content of the MMS message; and
transmitting the stored audio content of the MMS message to the recipient.

18. The method of claim 17, wherein:
an alternate mechanism for apprising the recipient about the audio content of the MMS message comprises initiating a telephone call to the recipient device; and
transmitting the stored audio content of the MMS message to the recipient comprises playing the message when the telephone call is answered.

19. The method of claim 17, wherein:
an alternate mechanism for apprising the recipient about the audio content of the MMS message comprises an e-mail message; and
the stored audio content of the MMS message is transmitted to the recipient as an attachment to the e-mail message.

20. The method of claim 17, wherein:
an alternate mechanism for apprising the recipient about the audio content of the MMS message comprises sending a notification to the recipient, the notification including information permitting the recipient to access an IVR system wherein the audio content of the MMS message is stored; and the stored audio content of the MMS message is transmitted from the IVR system to the recipient in response to the IVR system receiving a request for the stored audio content of the MMS message from the recipient.

21. The method of claim 20, wherein the information permitting the recipient to access the IVR system comprises one or more of:
   a telephone number of the IVR system;
   an explanation of the way in which the audio content of the MMS message can be retrieved;
   an identifier of the sender device;
   a subject line;
   a date and time of creation of the MMS message;
   a location of the sender; and
   a link pointing to a web page from which the recipient may play the audio content of the MMS message.

22. The method of claim 20, wherein the notification comprises one or more of:
   an e-mail message;
   an instant message;
   an SMS message; and
   a page.

23. The method of claim 22, wherein the recipient uses a telephony device and the notification information to contact the IVR system, and to request and receive the stored audio content of the MMS message.

24. The method of claim 17, wherein:
   the audio content of the MMS message is stored in a voicemail server associated with the recipient device; and
   an alternate mechanism for apprising the recipient about the audio content of the MMS message comprises the voicemail server transmitting a message notification to the recipient device.

25. The method of claim 24, wherein the recipient device comprises a landline telephony device.

26. The method of claim 17, further comprising, prior to storing the audio content of the MMS message, transcoding the audio content of the MMS message into a format selected from the group of .WAV format, .WMA format or MP3 format.

27. The method of claim 17, further comprising:
   receiving a second MMS message from the sender device, the second MMS message designating a different, second recipient; and
   in response to determining that a second recipient device associated with the second recipient is capable of directly processing the second MMS message, directly transmitting the second MMS message to the second recipient device without determining an alternate mechanism for apprising the second recipient about the audio content of the second MMS message.

28. The method of claim 17, further comprising permitting a recipient to manage the stored audio content of the MMS message.

29. The method of claim 28, wherein permitting a recipient to manage the stored audio content of the MMS message comprises permitting one or more of:
   replay of the audio content of the MMS message;
   deletion of the audio content of the MMS message;
   storage of the audio content of the MMS message;
   forwarding the audio content of the MMS message to a second recipient;
   fast-forwarding through the audio content of the MMS message;
   fast-backwarding through the audio content of the MMS message; and
   skipping the audio content of the MMS message.

\* \* \* \* \*